United States Patent
Rattunde (10) Patent No.: US 11,045,877 B2
(45) Date of Patent: Jun. 29, 2021

(54) CHAMFERING TOOL WITH GUIDE FOR ELIMINATING VIBRATIONS

(71) Applicant: RATTUNDE & CO. GMBH, Ludwigslust (DE)

(72) Inventor: Ulrich Rattunde, Bentwisch (DE)

(73) Assignee: Rattunde AG, Ludwigslust (DE)

( * ) Notice: Subject to any disclaimer, the term of this patent is extended or adjusted under 35 U.S.C. 154(b) by 0 days.

(21) Appl. No.: 15/772,050

(22) PCT Filed: Nov. 1, 2016

(86) PCT No.: PCT/EP2016/076303
§ 371 (c)(1),
(2) Date: Apr. 28, 2018

(87) PCT Pub. No.: WO2017/076833
PCT Pub. Date: May 11, 2017

(65) Prior Publication Data
US 2018/0236560 A1    Aug. 23, 2018

(30) Foreign Application Priority Data

Nov. 3, 2015   (DE) .................... 10 2015 118 769.8

(51) Int. Cl.
*B23B 5/16*   (2006.01)

(52) U.S. Cl.
CPC .......... *B23B 5/168* (2013.01); *B23B 2250/16* (2013.01); *B23B 2260/008* (2013.01)

(58) Field of Classification Search
CPC .............. B23B 5/168; B23B 2260/008; B23B 2250/16; B23B 5/167; B23B 5/162; B23B 5/16; B23B 51/103
USPC .................................................. 408/199, 211
See application file for complete search history.

(56) References Cited

U.S. PATENT DOCUMENTS

| | | | |
|---|---|---|---|
| 1,554,669 A * | 9/1925 | Watkins | B23B 5/168 407/40 |
| 2,374,761 A | 5/1945 | Lusa | |
| 2,595,541 A * | 5/1952 | Riordan | B23B 5/162 144/205 |
| 3,266,345 A | 8/1966 | Weisner et al. | |

(Continued)

FOREIGN PATENT DOCUMENTS

| | | |
|---|---|---|
| CN | 103 357 932 A | 10/2013 |
| DE | 25 41 414 A1 | 7/1976 |

(Continued)

*Primary Examiner* — Eric A. Gates
*Assistant Examiner* — Paul M Janeski
(74) *Attorney, Agent, or Firm* — Bay State IP, LLC (57) ABSTRACT

The invention relates to a cutting machine with a receiving area for a tube section and with a tool head (1) which can be rotated relative to the receiving area about a longitudinal axis (L), has at least one cutting tool (6) for machining a tube section end (40) of the tube section located in the receiving area, and has a support component (2), wherein the support component faces the receiving area and has an annular component (3) which rotates relative to the support component (2) about the longitudinal axis (L) and is designed to be randomly supported on a tube wall (42, 42) of the tube section end (40). The invention further relates to a corresponding method for reducing vibrations.

8 Claims, 5 Drawing Sheets

(56) References Cited

U.S. PATENT DOCUMENTS

| | | | | |
|---|---|---|---|---|
| 3,335,526 A | * | 8/1967 | Weiss | B23B 5/168 |
| | | | | 451/180 |
| 3,999,452 A | | 12/1976 | Larsen | |
| 4,437,366 A | * | 3/1984 | Astle | B23B 5/162 |
| | | | | 82/113 |
| 4,753,143 A | | 6/1988 | Mynhier | |
| 4,930,948 A | * | 6/1990 | Bowen | B23C 3/051 |
| | | | | 408/181 |
| 5,076,122 A | | 12/1991 | Katzenburger et al. | |
| 5,150,755 A | * | 9/1992 | Cassel | B23B 5/16 |
| | | | | 166/297 |
| 5,314,270 A | | 5/1994 | Lavancy et al. | |
| 2008/0011468 A1 | * | 1/2008 | Harper | B23B 5/162 |
| | | | | 166/55.3 |

FOREIGN PATENT DOCUMENTS

| | | | |
|---|---|---|---|
| DE | 20 200 351 U1 | 3/2002 | |
| EP | 0 155 095 A1 | 9/1985 | |
| EP | 2 106 313 B1 | 10/2009 | |
| JP | 07096403 A * | 4/1995 | ............... B23B 5/16 |
| WO | WO 9 848 961 | 11/1998 | |

* cited by examiner

CHAMFERING TOOL WITH GUIDE FOR ELIMINATING VIBRATIONS

CROSS REFERENCE TO RELATED PATENT APPLICATIONS

This patent application is filed herewith for the U.S. National Stage under 35 U.S.C. § 371 and claims priority to PCT application PCT/EP2016/076303, with an international filing date of Nov. 1, 2016. The contents of this application are incorporated in their entirety herein.

BACKGROUND OF THE INVENTION

The invention relates to a cutting machine and a method for reduction in particular of regenerative chatter of the cutting machine.

Cutting machines are well known in the prior art in the form of rotating tool heads for tube ends. A tool head is disclosed for example in EP 2 106 313 B1.

DE 2541414 discloses a tool which can be actuated manually for chamfering of a tube end. The tool is actuated at a low rotational speed. The tool is guided by radially outer parts which extend beyond the cutting edges, as well as a guide means on which rotatable discs are fitted.

Cutting machines with rotating tool heads are bodies which are capable of vibration, with the aid of which tube sections which have been cut to length are reworked. In particular an end of the tube section can be provided with a chamfer. In order to form chamfers, the tool heads are moved in an extension of the longitudinal axis of the tube section towards the tube end, and the tool heads rotate and have one or more cutting plates, with the aid of which both an inner or outer chamfer and also a flat face are applied to the end of the tube section. Chips are removed from the tube section end during application of the chamfers and of the flat face.

The tool head is located at the end of a rotating spindle and together with the spindle forms a body which is capable of vibration. In principle both the outer and also the inner walls of the tube sections are never exactly circular, so that load changes occur during the cutting operation. If the load changes are in the region of the natural frequency of the tool head mounted on the spindle, undesirable chatter can ensue. On the one hand the chatter subjects the cutting machine to loading, and on the other hand the tube section end to be produced is corrugated, and losses of quality ensue. The tube section end to be machined may even become unusable. A special form of chatter is so-called regenerative chatter. The natural vibration of the tool head is repeatedly excited by the already produced surface corrugation which is formed by the same cutting tool in the already pre-machined surface. This results in chatter which is increasingly intensive.

In order to avoid regenerative chatter there are various approaches to a solution in the prior art.

For example, in the case of cutting tools with multiple cutters or reaming tools, the cutters are arranged at different distances relative to one another and thus the natural frequency is continuously changed during cutting. The consequence of this is that the regenerative chatter does not even occur in the ideal case. In the case of tools with a single cutter, naturally, a change of the cutter spacing is not possible.

However, it is known that a rotational speed of the rotating cutting tool is continuously changed quickly, but in the case of high frequencies this leads to substantial loading of the machine.

In addition, active damping systems are known in which the vibrations are detected electronically and the natural frequency of the system is changed by means of an additional mass. In addition, there are passive damping systems, in which hydraulic dampers or additional spring/mass systems, so-called absorbers, are provided which for the most part eliminate the resonant frequency.

However, the said systems for preventing the regenerative chatter are exceptionally elaborate and also require intensive maintenance.

BRIEF SUMMARY OF THE INVENTION

Therefore the object of the invention is to provide a cutting machine in which the regenerative chatter occurs to a lesser extent, preferably not at all, and nevertheless the maintenance costs thereof are not increased, and also to provide a simple method for reducing the regenerative chatter.

In the first aspect this object is achieved by a cutting machine with the features of claim 1.

The cutting machine according to the invention comprises a receiving area for a tube section and a tool head which can be rotated relative to the receiving area about a longitudinal axis, has at least one cutting tool for machining a tube section end of the tube section located in the receiving area. The tube section can be fixed in position relative to a frame of the cutting machine in the receiving area, in particular during the machining. The receiving area is preferably provided in a fixed position relative to the frame of the cutting machine. In particular before and after the cutting, the tool head is movable to and fro relative to the receiving area in a longitudinal direction of the receiving area and of the tube section received therein.

The tool head is driven mechanically, preferably by an electric motor. The tool head is designed to be movable relative to the frame. In short intervals of a few seconds the cutting machine successively processes a plurality of, preferably dozens, hundreds or more, tube sections. During the machining the cutting machine preferably stands on a base.

According to the invention a support component facing in the direction of the receiving area is provided on the tool head and has an annular component which is rotatable about the longitudinal axis relative to the support component and is designed to be randomly supported on a tube wall of the tube section end. The support component and the cutting means, preferably cutting plates, are rotationally fixed to one another during the machining.

The support component is a component for reduction or prevention of the regenerative chatter.

The support component can be constructed in particular in the form of a mandrel, and in the event of the embodiment of the support component as a mandrel the annular component is preferably rotatably arranged externally on the mandrel, wherein an external diameter of the annular component in cross-section perpendicular to the longitudinal axis is smaller than an internal diameter of the tube end, but an external diameter of the annular component is greater than a mandrel diameter, in such a way that during the cutting operation the mandrel introduced into the tube section end with its annular component randomly abuts the inner wall of the tube section end and an interruption of the vibration process of the tool head is produced by the abutment.

The tube end is rotated relative to the tool head with its at least one cutting tool. In this case, in a variant of the cutting machine, the tool head can be held in space and the tube section can be rotated, whilst in another variant the tube section is held in space and the tool head is rotated. Naturally a combination of both variants is also conceivable.

By means of the at least one cutting tool the tool head machines walls of the tube section, in particular the cutting tool applies inner and outer chamfers as well as a flat face to the tube section end.

The tube section is in particular a metal construction, in particular it is an iron or steel workpiece. In principle, however, other materials are also conceivable. The tube has a preferably circular external or internal diameter over its entire length. However, the cutting machine is also suitable for machining tube ends which are not exactly circular, wherein in principle "circular" is not to be understood as a mathematically exact circular shape, but also covers slight deviations, in the micrometer range or larger, from the mathematically exact circular shape. The cutting machine and also in particular the method according to the invention are also suitable for machining tube sections with such internal and external diameters which are not exactly circular.

The tool head is vibrationally excited during the machining. Due to the vibrations the mandrel is likewise moved out of its longitudinal axis, and in this case the annular component butts against the inner wall of the tube section. The external diameter of the annular component is dimensioned so that it is somewhat smaller than an internal diameter of the tube section, so that in principle the mandrel with the annular component can be introduced without contact into the end of the tube section. Due to the contact of the annular component with the inner wall of the tube section end the vibration process is disrupted, and in particular the periodicity of the excitation of the natural vibration of the tool head is interrupted, and no regenerative chatter is produced.

In another embodiment of the invention the tool head of the cutting machine according to the invention is provided with a support component configured as a bushing, wherein the annular component is arranged rotatably inside the bushing and an internal diameter of the annular component is greater than an external diameter of the tube section end, so that the bushing can be guided from the exterior around the tube section end. However, the principle for prevention of the regenerative chatter is similar to that of the embodiment with the mandrel. The tool head excited to slight vibrating movements butts with its annular component against the outer wall of the tube section end, and as a result the vibrational behavior of the tool head is interrupted. No buildup of the vibration can occur.

In a particularly advantageous embodiment of the invention a support surface of the annular component, which in the embodiment of the mandrel is an outer surface of the annular component or in the configuration as a bushing is an inner surface of the annular component, is provided with a profile. Thus the support surface of the annular component is not exactly circular in every cross-section along the longitudinal direction. The profile preferably has, in cross-section, recesses in the direction away from the tube wall. These depressions or recess preferably extend along the entire longitudinal direction of the annular component. The recesses make it possible that chips do not jam between the annular component and the tube wall, but can be drawn off into the interior of the tube or outwards via the recesses. The profile preferably has a meandering shape in cross-section. In this case the recesses can extend exactly parallel to the longitudinal direction of the annular component, but it is also conceivable that the recesses extend obliquely with respect to the longitudinal direction of the annular component. However, other configurations of the profile are also conceivable, for example along the circumference depressions or recesses of different widths and raised areas of different widths, or also recesses and/or raised areas which do not extend in an exactly straight line, but are undulating or conically widening or tapering raised areas or recesses.

The annular component is advantageously mounted in a ball bearing on the support component. Thus the annular component is arranged rotatably about the longitudinal axis on the tool head. However, the annular component does not make possible any vibrating movement, i.e. movements perpendicular to the longitudinal axis relative to the support component or the tool head.

The annular component is advantageously interchangeable, in that the support component has a cap which is removable and enables the replacement of the annular component by an annular component of greater or lesser diameter.

With regard to the method, the object is achieved by a method with the features of claim 9. The method is suitable in particular to be carried out with one of the cutting machines described above.

The method is intended in particular for reducing vibrations, in particular the regenerative chatter of a cutting machine. A cutting machine should be understood here in particular to be a machine for machining tube section ends. According to the invention a tube section is rotated relative to a tool head with at least one chip-removal tool. The tool head cuts walls of the tube end by means of the at least one cutting tool. During the cutting the tool head is usually vibrationally excited, and the tool head is supported on the wall of the pipe sections by means of a support component which has an annular component rotating about the longitudinal axis, so that the vibrational excitation is interrupted and in particular a regenerative chatter is avoided.

With regard to the method, the invention also makes use of the idea of preventing vibrations from building up due to periodic excitation, in that a disruption of the vibration process is produced by the support component which is preferably guided, in the form of a mandrel or also in the form of a bushing, into or externally around the tube section end. Already with low vibrating movements of the tool head out of the longitudinal axis, the support component by means of its annular component produces a contact with the tube end, thereby interrupting the vibration process, and a buildup of the vibrating movement cannot occur.

The annular component is mounted rotatably relative to the tool head, so that the angular velocity of the annular component during contact with the wall of the tube section end decreases, whilst a rotational speed of the tool head does not need to change due to the contact of the annular component with the wall of the tube end. As a result the cutting machine is hardly or only very slightly loaded, since there is no need for any changes of speed of the spindle which rotates the tool head.

BRIEF DESCRIPTION OF THE SEVERAL VIEWS OF THE DRAWINGS

The invention is described with reference to an embodiment with six drawings. In the drawings.

DETAILED DESCRIPTION OF THE INVENTION

Figure 1:
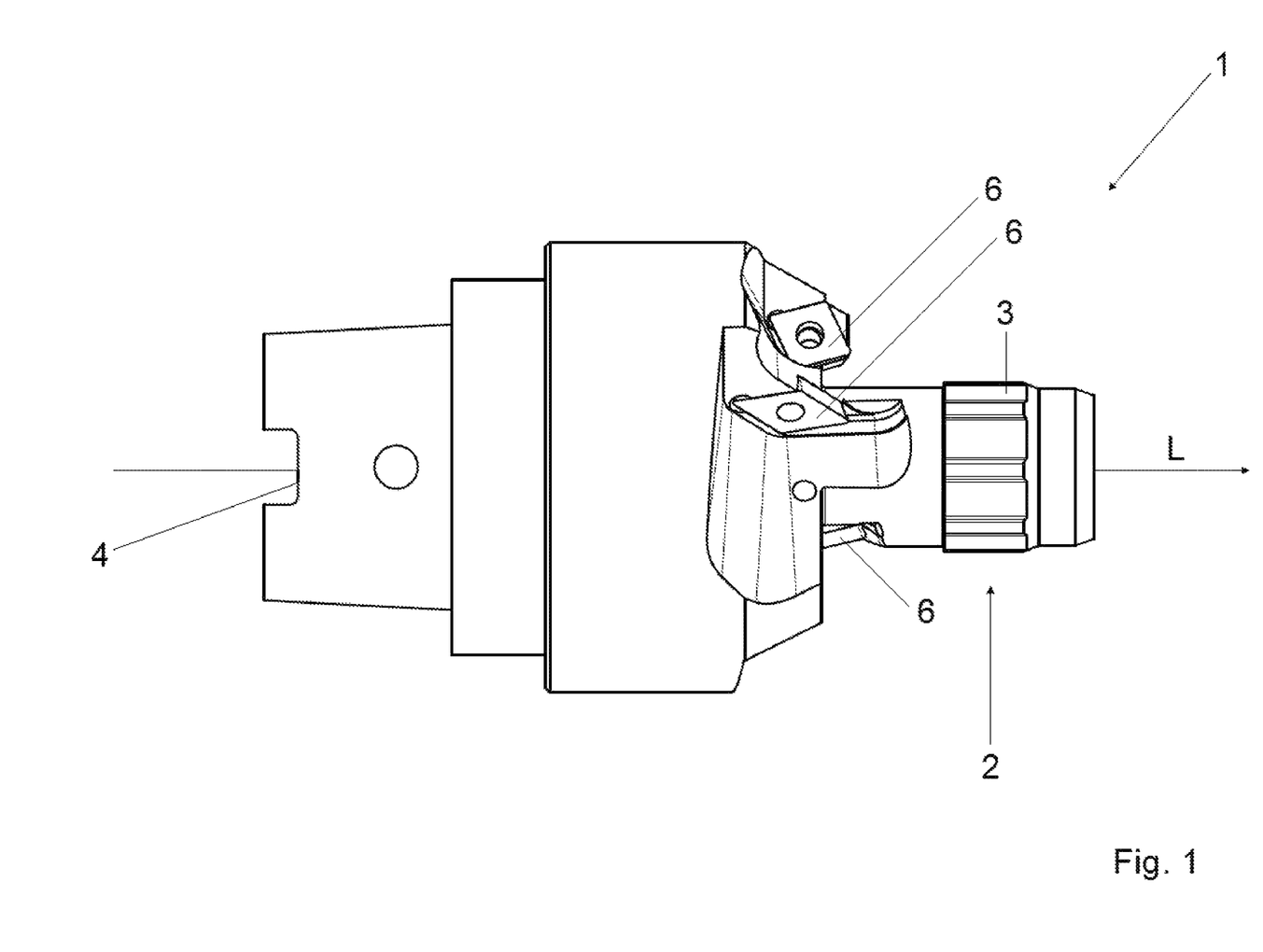
FIG. 1 shows a side view of a tool head according to the invention.

A tool head 1 illustrated in FIG. 1 additionally has a mandrel 2 projecting with respect to tool heads, which are known for example from EP 2 106 313 B1, along a longitudinal axis L of the tool head, an annular component 3 being rotatably mounted on the outer end of the mandrel. The annular component 3 and the mandrel 2 are substantially circular in cross-section perpendicular to the longitudinal axis L and are arranged concentrically around the longitudinal axis L of the tool head 1. On one end of the tool head 1 opposite the mandrel 2 a spindle receiving area 4 is provided, by which the tool head 1 is interchangeably fastened on a spindle (not shown) in a controlled manner.

The tool head 1 in FIG. 1 has four cutting plates 6, of which three can be seen in FIG. 1. The cutting plates 6 are intended for machining of a tube section end 40 which in cross-section has a circular internal diameter and a circular external diameter. Two of the cutting plates 6 are intended for application of an outer chamfer on the tube section end 40 and two other cutting plates 6 for application of an internal chamfer on the tube section end 40. The tube section end 40 is preferably made of metal, particularly preferably steel, but other materials can also be envisaged. By comparison with the embodiment in FIG. 1 the tool head 1 can also have a different number of cutting plates 6, in particular one, two, three or a higher number of cutting plates 6.

Figure 4:
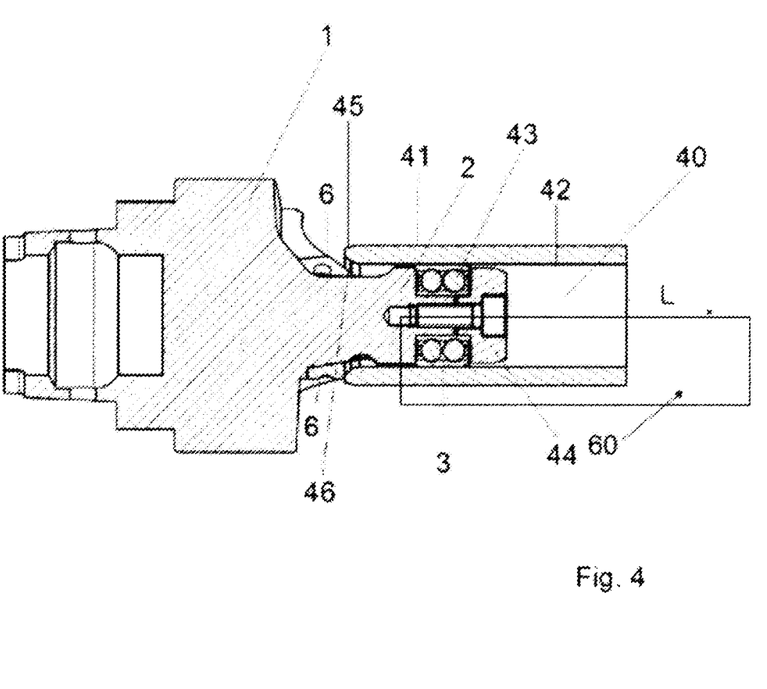
FIG. 4 shows a sectional view of the tool head along the line IV-IV in FIG. 3, wherein a mandrel of the tool head according to the invention is additionally inserted into a tube section end.

According to FIG. 4, the tool head 1 and the tube section end 40 rotate about the longitudinal axis L relative to one another, and in this case the tube section end 40 can be held fixedly in space in a receiving area 60 relative to the tool head 1, whilst the tool head 1 rotates about the longitudinal axis L, but conversely the tool head 1 can also be held fixedly in space in the receiving area 60 and the tube section end 40 can be rotated about the same longitudinal axis L. During the rotation operation the cutting plates 6 remove chips from an outer wall 41 or an inner wall 42 of the tube section end 40.

During the cutting operation load changes of the cutting forces can occur, for example due to the outer wall 41 or the inner wall 42 being not exactly circular, which in reality is actually always the case, so that in the real cutting operation the removed chips have slightly differing thicknesses, and even in the case of an ideally circular tube section 40 load changes will occur which lead to the tool head 1 first of all being set in slight vibrational movements out of the longitudinal axis L which, however, can be periodically strengthened by continuous relative rotation of the tool head 1 and the tube section 40 and thus lead to the so-called regenerative chatter.

The corrugation of the outer surface 42 of the tube section 40 or of the inner wall 42 of the inner wall 42 of the tube section end 40 periodically repeatedly excites the tool head 2 to the same vibrations. Usually tool heads rotate at approximately 5,000 r.p.m., but other rotational speeds are also conceivable. The tool head 1 is mounted on a rotating spindle (not shown) oriented in the longitudinal direction L and can vibrate out of the longitudinal axis L. The vibrational behavior of the tool head 1 is determined substantially by a rigidity c of the tool head 1 mounted on the spindle, a damping d and a mass m of the tool head 1 with the spindle. In particular a natural frequency $f_{eigen}$ of the tool head 1 is a function of these three parameters, and in this case "natural frequency $f_{eigen}$" means the natural frequency with which the tool head 1 mounted on the spindle vibrates out of the longitudinal axis L. The invention makes use of the idea of introducing a disruption into the natural vibration of the tool head 1 by the mandrel 2 with the annular component 3 mounted rotatably about the longitudinal axis L on the mandrel 2.

Figure 2:
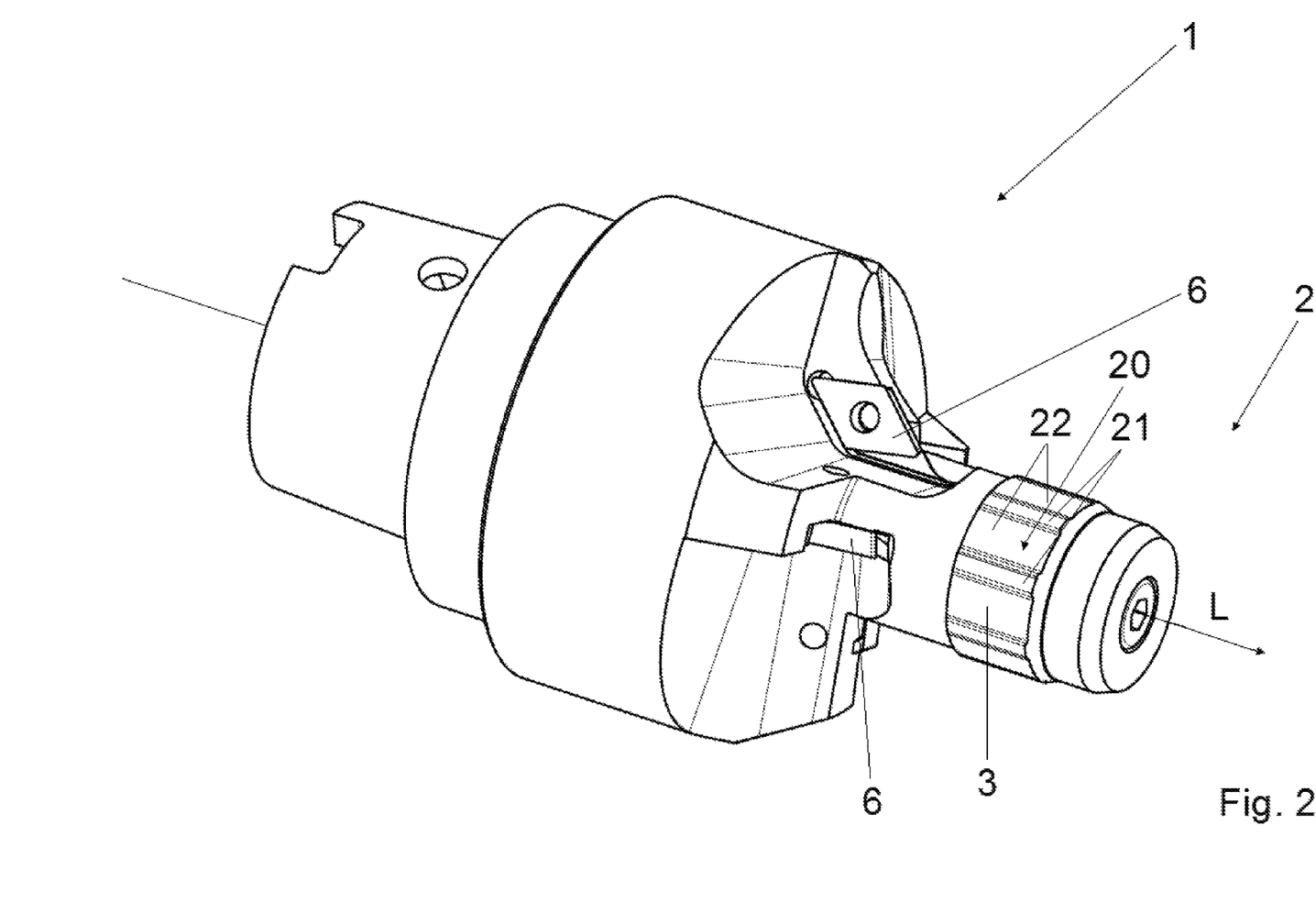
FIG. 2 shows a perspective view of the tool head in FIG. 1.

FIG. 2 shows the tool head 1 in FIG. 1 in a perspective view, which illustrates somewhat more clearly the design of the mandrel 2 of circular cross-section with the annular component 3 mounted rotatably on the mandrel. Furthermore, two of the four cutting plates 6 can be seen. The cutting plates 6 are interchangeably mounted on the tool head 1. According to the invention a support surface 20 externally surrounding the annular component 3 is not exactly circular in cross-section, but the support surface 20 has a meandering configuration in cross-section. In other words, the cross-sectionally exact circular shape is periodically interrupted by depressions in the radial direction inwards towards the longitudinal axis L, so that recesses 21 running along the longitudinal axis L are provided in the outer wall of the annular component 3 and extend over an entire longitudinal extent along the longitudinal axis L of the annular component 3.

Figure 3:
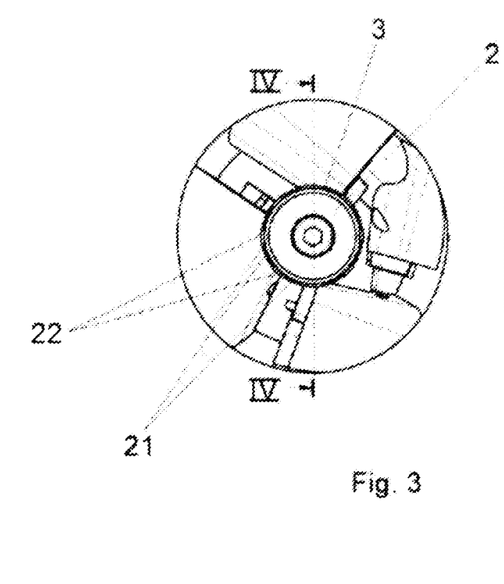
FIG. 3 shows a front view of the tool head in FIG. 2.

FIG. 3 shows the tool head 1 in FIGS. 1 and 2 in a front view, and in this case the cross-sectionally circular mandrel 2 can be seen, as well as the annular component 3 projecting radially over a mandrel diameter, wherein the outer support surface 20 of the annular component 3 has the meandering shape described above which deviates from the exact circular shape. In cross-section according to FIG. 3 radially outer raised areas 22 of the annular component 3 form regions of an exactly circular shape with a first greater radius, and the recesses 21 of the annular component 3 form areas having an exact circular shape with a second smaller radius. Both the smaller radius and also the greater radius of the annular component 3 are in each case greater than the radius of the mandrel 2.

FIG. 4 shows the tool head 1 according to the invention in its intended application, and in this case the mandrel 2 is introduced into the open tube section end 40, an internal diameter of the tube section end 40 is greater than each diameter of the annular component 3, so that in the event of exact introduction along the longitudinal axis L of a tube section the mandrel 2 with the annular component 3 does not touch the inner wall 42 of the tube section end 40. The annular component 3 is rotatably mounted on the mandrel 2 by means of a ball bearing 43, but it is not radially movable to and fro relative to the longitudinal axis L of the tool head 1, the annular component 3 being exclusively rotatably mounted on the tool head 1. The mandrel 2 has a removable cap 44. After removal of the cap 44 the annular component 3 can be replaced by another annular component, and in this case the other annular component can in particular have another large radius and thus can be suitable for machining of tube section ends 40 with other internal diameters.

During the cutting operation the cutting plates 6 remove chips from the inner wall 42 or outer wall 41 of the tube section end 40, and thus apply an inner or outer chamfer 46, 45 to the edge of the tube section end 40. During the cutting operation slight vibrations of the tool head 1 occur, which lead to the annular component 3 of the mandrel 2 coming into contact with the inner wall 42 of the tube section end 40. In this way the vibration process of the tool head 1 is disrupted, and the tool head 1 is not excited to natural vibration. However, due to the rotatable mounting of the annular component 3 on the mandrel 2, on the one hand the actual cutting operation is not interrupted, because the annular component 3 only generates a very slight friction on the inner wall 42, and on the other hand the inner wall 42 is also not damaged, since the annular component 3 does not rub along the inner wall 42 but, in the event of contact due to its low mass relative to the tool head 1, is immediately transferred from rotational movement to a standstill.

Figure 5:
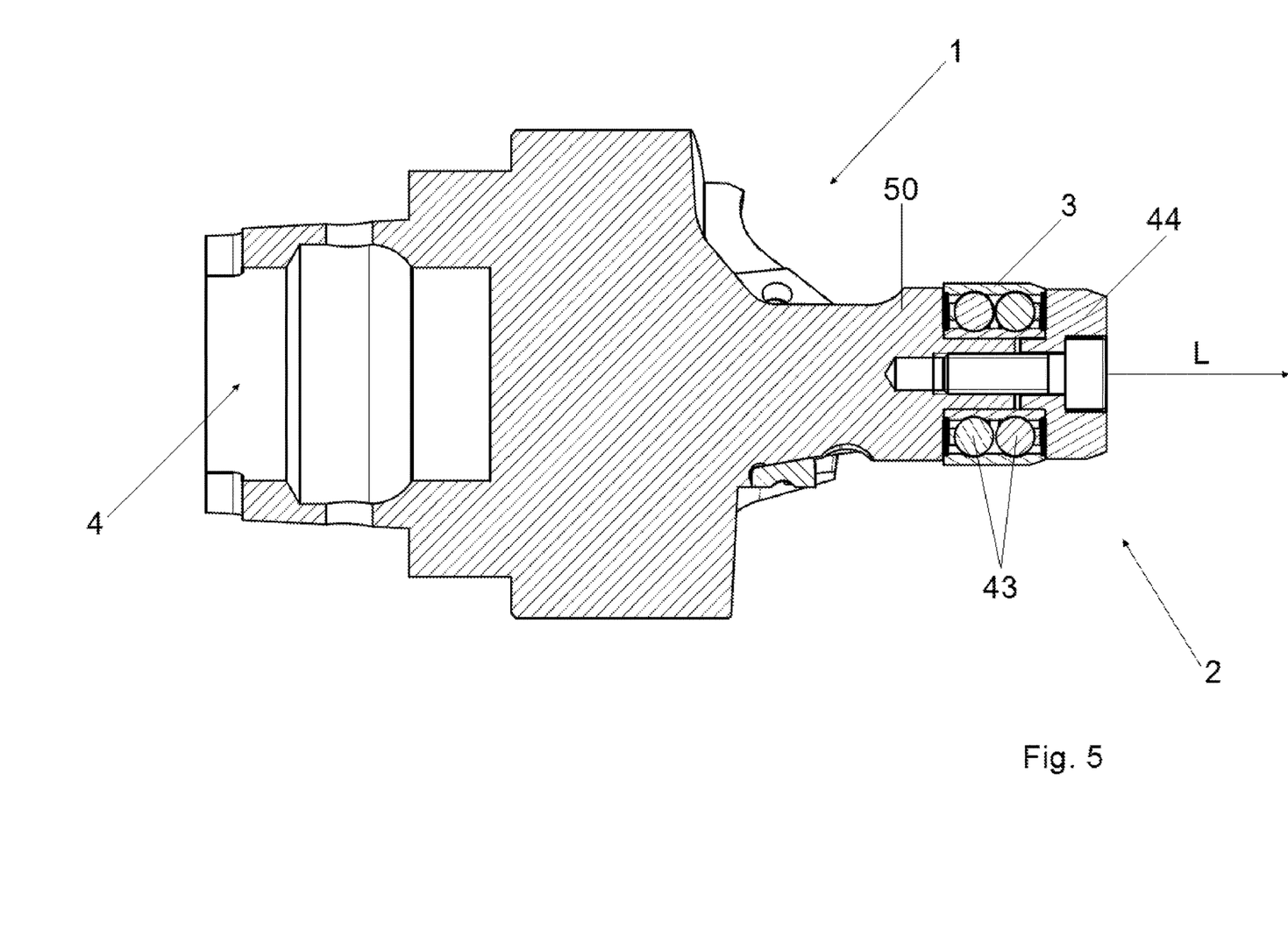
FIG. 5 shows a sectional view according to FIG. 4 without the tube section end.

In FIG. 5 the schematic structure of the tool head 1 according to the invention in FIG. 4 is shown without the tube section end 40, and in particular the rotatable annular component 3 with the circulating ball bearings 43 is illustrated as well as the cap 44 of the mandrel 2, which can be removably screwed in place on a mandrel connection piece 50 and which makes it possible to replace the annular component 3 when the cap 44 is removed. The spindle receiving area 4 opposite the mandrel 2 can be seen on the left in FIG. 4.

Figure 6:
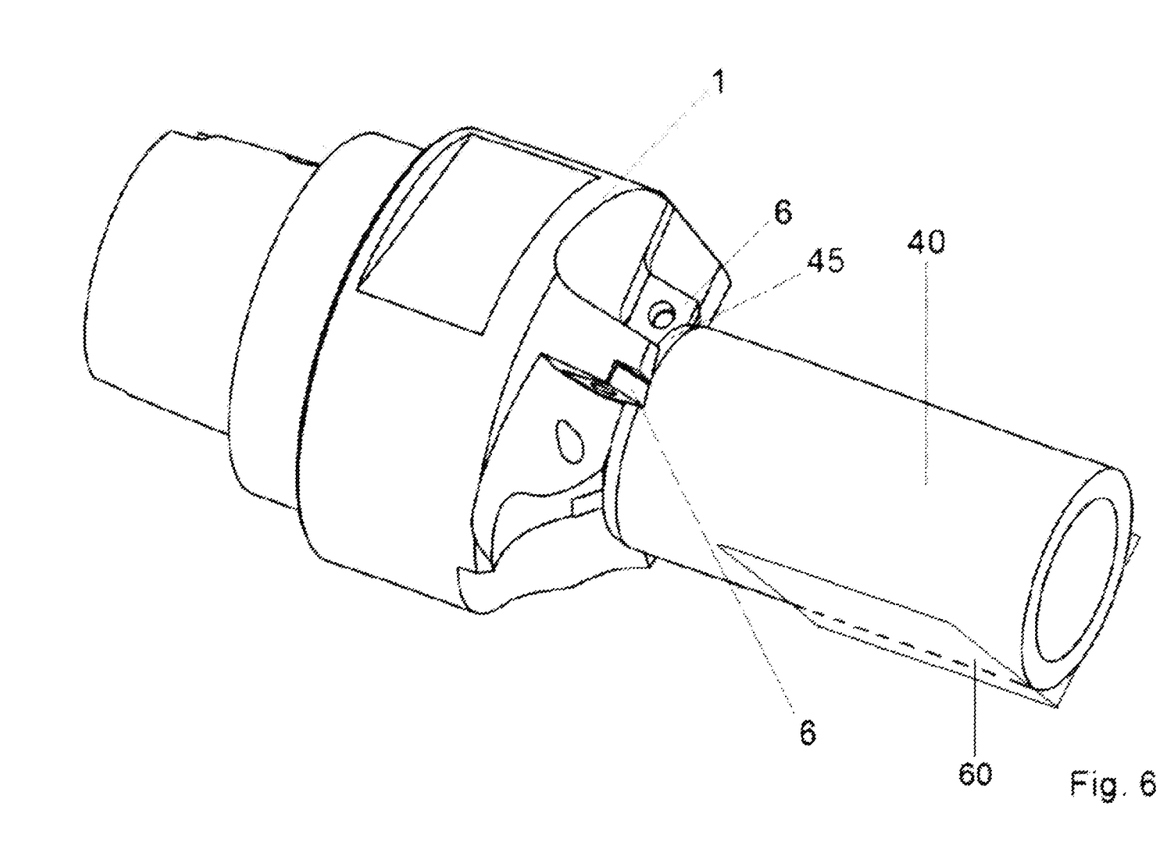
FIG. 6 shows a perspective view of the tool head according to FIG. 4 inserted into a tube section end.

FIG. 6 shows the tool head 1 with the tube section end 40 in operation, the spindle is not shown, but it can be seen that the mandrel 2 is introduced invisibly into the tube section end 40 and the cutting plates 6 have already applied the outer chamfer 45 discernibly and the internal chamfer 46 indiscernibly to the tube section end 40. The tube section is even longer along the longitudinal axis L than the tube section end 40 illustrated in FIG. 6.

LIST OF REFERENCE NUMERALS 1 tool head
2 mandrel
3 annular component
4 spindle receiving area
6 cutting plates
20 support surface
21 recesses
22 radially outer raised areas
40 tube section end
41 outer wall
42 inner wall
43 ball bearing
44 cap
45 outer chamfer
46 internal chamfer
50 mandrel connection piece
c rigidity
d damping
m mass
$f_{eigen}$ natural frequency of the tool head
L longitudinal axis

What is claimed is:

1. A cutting machine comprising:
   a receiving area (60) for a metallic tube section whereby the cutting machine stands on a base during machining and the metallic tube is fixed in position in the receiving area and a tool head (1) which can be rotated relative to the receiving area about a longitudinal axis (L), and the tool head (1) has at least one cutting tool (6) relatively unmovable fixed to the tool head (1) for machining a metallic tube section end (40) of the tube section located in the receiving area, and has a support component (2) which faces in the direction of the receiving area
   and has an annular component (3) which is rotatable about the longitudinal axis (L) relative to the support component (2) and an external diameter of the annular component (3) is dimensioned so that it is somewhat smaller than an internal diameter of the tube section, so that the support component (2) with the annular component (3) can be introduced without contact into the end of the tube section and is configured to be randomly supported on a metallic tube wall (42) of the metallic tube section end (40) and to interrupt regenerative chatter, wherein due to vibration of the tool head (1) the annular component (3) randomly abuts the inner wall of the tube section end (40),
   and a support surface (20) of the annular component (3) has a profile comprising recesses (21) extending along the longitudinal axis (L) of the annular component (3).

2. A cutting machine according to claim 1,
   characterised in that the support component is configured as a mandrel (2) and the annular component (3) is arranged so as to be rotatable externally on the mandrel (2), and an external diameter of the annular component (3) is smaller in cross-section perpendicular to the longitudinal axis (L) than an internal diameter of the tube section end (40).

3. A cutting machine according to claim 1,
   characterized in that the profile has, in cross-section, recesses (21) in the direction away from the tube wall (41, 42).

4. A cutting machine according to claim 1,
   characterized in that the profile has a meandering shape in cross-section.

5. A cutting machine according to claim 1,
   characterized in that the annular component (3) is mounted in a ball bearing (43) on the support component (2).

6. A cutting machine according to claim 1,
   characterized in that the annular component (3) is replaceable by another annular component with another radius.

7. A method for reducing vibrations, in particular the regenerative chatter of a cutting machine according to claim 1, wherein
   whereby the cutting machine stands on a base during machining and a metallic tube is fixed in position in a receiving area the metallic tube section rotates relative to a tool head (1) with at least one cutting tool (6) relatively unmovable fixed to the tool head (1),
   the tool head (1) cuts walls (41, 42) of the metallic tube section end (40) by means of the at least one cutting tool (6),
   the tool head (1) and the support component (2) are vibrationally excited during the cutting,
   the tool head (1) is supported on one of the walls (41, 42) of the metallic tube section end (40) by means of a support component (2) which has an annular component (3) rotating about a longitudinal axis (L), and an external diameter of the annular component (3) is dimensioned so that it is somewhat smaller than an internal diameter of the tube section, so that the support component (2) with the annular component (3) can be introduced without contact into the end of the tube section and the annular component (3) randomly contacts the inner wall of the metallic tube wherein due to vibration of the tool head (1) the annular component (3)

randomly abuts the inner wall of the tube section end (40) and as a result vibrational excitement is interrupted.

8. A method according to claim 7, characterized in that the annular component (3) has an angular velocity which decreases during contact with the wall (41, 42), whilst a rotational speed of the tool head (1) is not changed by the contact.

\* \* \* \* \*